E. I. DODDS & C. HYLAND.
STAY BOLT FOR BOILERS.
APPLICATION FILED MAR. 7, 1917.
1,298,305.
Patented Mar. 25, 1919.
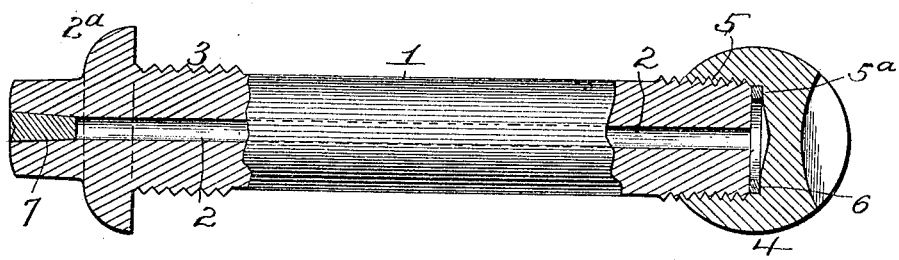

UNITED STATES PATENT OFFICE.

ETHAN I. DODDS AND CHARLES HYLAND, OF PITTSBURGH, PENNSYLVANIA, ASSIGNORS TO FLANNERY BOLT COMPANY, OF PITTSBURGH, PENNSYLVANIA.

STAY-BOLT FOR BOILERS.

1,298,305.  Specification of Letters Patent.  Patented Mar. 25, 1919.

Application filed March 7, 1917. Serial No. 153,043.

*To all whom it may concern:*

Be it known that we, ETHAN I. DODDS and CHARLES HYLAND, citizens of the United States, and residents of Pittsburgh, in the county of Allegheny and State of Pennsylvania, have invented certain new and useful Improvements in Stay-Bolts for Boilers; and we do hereby declare the following to be a full, clear, and exact description of the invention, such as will enable others skilled in the art to which it appertains to make and use the same.

This invention relates to improvements in staybolts for boilers, and more particularly to such as are known in the art as "flexible" staybolts,—one object of the invention being to provide a simple and efficient stay-bolt structure which may be conveniently made from a tubular bar, the bore of which extends entirely through the bar longitudinally from end to end, and to so apply the head to the outer end of the bar as not to interfere with the continuity of the bore which forms the tell-tale hole, but so that the outer end of said bore shall be effectually closed within the head.

With this object in view, the invention consists in certain novel features of construction and combinations of parts as hereinafter set forth and pointed out in the claims.

The accompanying drawing is a sectional view of a staybolt showing an embodiment of our invention.

1 represents the body of the bolt and may be made of a tubular bar having a continuous bore 2 extending continuously through the bar from one end to the other and open at both ends, said bore constituting a tell-tale hole for the bolt. The inner end of the bar or bolt body 1 may be provided with a head 2ª of the "button head" type to rest against the inner boiler sheet and said bar or body may be threaded, as at 3, adjacent to this head to screw through said inner boiler sheet.

The outer end of the tubular bolt body 1 is threaded, to receive a spherical or partly spherical outer head 4 to be mounted at the outer boiler sheet, in a manner well known in the art. The head 4 is made with a threaded socket 5 to receive the threaded outer end portion of the bolt body, so that when the head is in place on the bolt body, the outer end of the bore or tell-tale hole 2 will be closed within said head.

The head 4 is provided interiorly with a shoulder 5ª, between which and the end of the bolt body 1, a gasket 6 is disposed to prevent leakage of water or steam at the headed outer end of the bolt, and the threaded connection of the head to the bolt body may be electrically welded to prevent possibility of loosening of said threaded connection.

It will be observed that the tell-tale hole is continuous through the body of the bolt from the inner end to the headed end, and that it is permanently closed at the outer end of the bolt within the head thereon.

If desired, a removable or destructible plug 7 may be inserted into the inner end of the tell-tale hole to keep the latter clean.

Having fully described our invention, what we claim as new and desire to secure by Letters-Patent, is:—

1. A flexible stay bolt comprising a body portion having a tell-tale bore extending through the same from end to end, and a separate head secured on the outer end of said body portion and closing the outer end of said bore.

2. A flexible staybolt comprising a body portion having a tell-tale bore extending throughout the length thereof, said body having a threaded end portion, and a separate head for the bolt, said separate head having a socket receiving the threaded end of the body portion and closing one end of the tell-tale bore in the latter.

In testimony whereof, we have signed this specification in the presence of two subscribing witnesses.

ETHAN I. DODDS.
CHARLES HYLAND.

Witnesses:
EDWIN S. RYCE,
HAROLD SCHUNEMAN.

Copies of this patent may be obtained for five cents each, by addressing the "Commissioner of Patents, Washington, D. C."